United States Patent
Bergmann et al.

(10) Patent No.: US 12,404,912 B2
(45) Date of Patent: Sep. 2, 2025

(54) PLANETARY GEARSET AND VEHICLE DRIVELINE

(71) Applicant: ZF Friedrichshafen AG, Friedrichshafen (DE)

(72) Inventors: Thomas Bergmann, Lappersdorf (DE); Thomas Waim, Grafenau (DE); Stefan Renner, Bodman-Ludwigshafen (DE); Martin Weiss, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/659,185

(22) Filed: May 9, 2024

(65) Prior Publication Data
US 2024/0376963 A1   Nov. 14, 2024

(30) Foreign Application Priority Data
May 10, 2023   (DE) ...................... 10 2023 204 344.0

(51) Int. Cl.
*F16H 57/08* (2006.01)
*B60K 17/04* (2006.01)
*F16H 1/28* (2006.01)

(52) U.S. Cl.
CPC ............. *F16H 1/28* (2013.01); *B60K 17/046* (2013.01); *F16H 57/082* (2013.01); *F16H 2057/085* (2013.01)

(58) Field of Classification Search
CPC .... F16H 1/28; F16H 57/082; F16H 2057/085; B60K 17/046
See application file for complete search history.

(56) References Cited

U.S. PATENT DOCUMENTS

| 4,407,382 A | 10/1983 | Dziuba et al. |
| 10,605,332 B2 | 3/2020 | Pluta et al. |
| 2006/0183592 A1 | 8/2006 | Kingston |

(Continued)

FOREIGN PATENT DOCUMENTS

| DE | 102008000445 A1 * | 9/2009 | ........... B60K 17/046 |
| DE | 102019201887 A1 * | 8/2020 | |

(Continued)

OTHER PUBLICATIONS

German Patent Office, Search Report issued in German patent application No. 10 2023 204 344.0 (Jan. 26, 2024).

*Primary Examiner* — Justin Holmes
(74) *Attorney, Agent, or Firm* — Finch & Maloney PLLC

(57) ABSTRACT

A planetary gearset (9) has a planetary carrier (11) and a plurality of planetary gearwheel axles arranged axially offset relative to one another and on which planetary gearwheels (13) are mounted to rotate. A first carrier section (14) is arranged at a first axial end of the planetary gearwheel axles and a second carrier section (15) is arranged at a second axial end of the planetary gearwheel axles. The first carrier section (14) is in the form of a casting with the planetary gearwheel axles formed as axially projecting journals (17) made integrally with the first carrier section (14). The second carrier section (15) is attached as a separate component onto the journals (17), and the first carrier section (14) and the second carrier section (15) hold the journals (17) axially at both ends at fixed, unvarying axial distances apart from one another.

15 Claims, 7 Drawing Sheets

(56) References Cited

U.S. PATENT DOCUMENTS

2017/0120675 A1* 5/2017 Chung ................. B60B 35/125
2019/0126747 A1   5/2019 Andersson et al.
2021/0404548 A1   12/2021 Sheppard et al.
2023/0134790 A1   5/2023 Waim et al.

FOREIGN PATENT DOCUMENTS

JP  2009228843 A * 10/2009 ........... F16H 57/082
JP  2013104548 A    5/2013

* cited by examiner

PLANETARY GEARSET AND VEHICLE DRIVELINE

RELATED APPLICATIONS

This application claims the benefit of and right of priority under 35 U.S.C. § 119 to German Patent Application no. 10 2023 204 344.0, filed on 10 May 2023, the contents of which are incorporated herein by reference in its entirety.

FIELD OF THE DISCLOSURE

The invention relates to a planetary gearset comprising a planetary carrier with a plurality of planetary gearwheel axles which are arranged axially offset relative to one another and on which planetary gearwheels are mounted to rotate, such that a first carrier section is arranged on a first axial side of the planetary gearwheel axles, and a second carrier section is arranged on a second axial side of the planetary gearwheel axles. In addition, the invention relates to a motor vehicle drivetrain with at least one planetary gearset.

BACKGROUND

Planetary gearsets are used in many fields as transmissions or part of a transmission, and with a compact structure enable the transmission of larger torques. Thus, among other things planetary gearsets are also used in motor vehicle drive axles for utility vehicles in order, as wheel-hub transmissions, to provide an additional gear ratio in the power flow between the individual driveshafts and the respectively associated wheel hub. In general, in a planetary gearset a planetary carrier is usually provided, which in most cases is fitted with a plurality of planetary gearwheel axles which serve for the rotatable mounting of planetary gearwheels on the planetary carrier.

For example, DE 10 2017 120 810 A1 describes a planetary gearset which is provided for use with a camshaft adjuster and, besides a sun gear and two ring gears, comprises a planetary carrier. While in this case the sun gear is connected rotationally fixed to an electric motor of the camshaft adjuster, one ring gear is connected rotationally fixed to the camshaft and the other ring gear is connected rotationally fixed to a sprocket by way of which, in a chain drive, a coupling is formed with a crankshaft of an internal combustion engine. In the planetary carrier, in this case, a plurality of planetary bolts as planetary axles are located between a first carrier section and a second carrier section, which bolts are axially offset relative to one another and on which planetary gearwheels are mounted to rotate. The carrier sections located axially at the two ends of the planetary gearwheel bolts consist in each case of a plurality of rigid connecting elements which, in particular, each connect two planetary gearwheel bolts to one another. In addition, with each carrier section there is associated at least one pre-stressing element by way of which the rigid connecting elements can be moved relative to one another so that the axial separations of the planetary bolts relative to one another can be varied. In that way mechanical tolerances of at least one of the ring gears can be compensated.

SUMMARY

Starting from the above-described prior art the purpose of the present invention is now to provide a planetary gearset characterized by low production cost and by means of which even large torques can also be transmitted without problems.

This objective is achieved by a planetary gearset as disclosed herein. Further advantages and developments of the invention will be apparent in light of the present disclosure. Furthermore, the present disclosure relates to a motor vehicle drivetrain comprising at least one planetary gearset according to the invention.

According to the invention, a planetary gearset comprises a planetary carrier with a plurality of planetary gearwheel axles arranged offset relative to one another, on which planetary gearwheels are mounted to rotate. In this case, a first carrier section is arranged at a first axial end of the planetary axles and a second carrier section is arranged at a second axial end of the planetary axles.

Thus, the planetary gearset according to the invention has a planetary carrier fitted with a plurality of planetary gearwheel axles. Preferably, the planetary carrier has at least two planetary gearwheel axles, but particularly preferably there are more than two planetary gearwheel axles. The planetary gearwheel axles are arranged axially offset relative to one another in particular being located on diameters corresponding to one another and being equidistant from one another in the circumferential direction. On each of the planetary gearwheel axles there is in particular one planetary gearwheel, and the respective planetary gearwheel is preferably mounted rotatably on its associated planetary gearwheel axle by means of a bearing, which in particular is in the form of a roller bearing but which, as an alternative, can also be a sliding bearing.

Preferably, individual planetary gearwheels are in the form of spur gears with at least one all-round set of teeth, which can be straight teeth or helical teeth. In particular, individual planetary gearwheels are provided with just one all-round set of teeth although in the context of the invention individual planetary gearwheels can also be stepped planetary gearwheels in which a plurality of all-round sets of teeth adjacent to one another can be provided. In the latter case, each individual planetary gearwheel can preferably consist of one component but may comprise more than one component.

Axially at the two ends of the planetary gearwheel axles, the planetary carrier is fitted with a carrier section in each case, each carrier section being provided to couple the planetary gearwheel axles with one another. In addition, one of the carrier sections is provided in particular in order to form a connection of the planetary carrier.

In the context of the invention "axial" means an orientation parallel to a rotation axis of the planetary gearset, whereas "radial" means an orientation in the direction of the diameter with the rotation axis as the mid-point.

The invention is now based on the technical principle that the first carrier section is in the form of a casting and the planetary gearwheel axles are in the form of axially projecting journals made integrally with the first carrier section, whereas the second carrier section is attached as a separate component onto the journals. Furthermore, the first carrier section and the second carrier section hold the journals axially at both ends at fixed, unvarying distances from one another.

In other words, the first carrier section and the planetary gearwheel axles are made as a casting such that the planetary gearwheel axles project as journals axially relative to the first carrier section made integrally therewith. In contrast, the second carrier section is in the form of a component separate from the first carrier section and the journals, with the second carrier section attached to each of the journals.

By virtue of the axially two-sided positioning of the carrier sections, the two carrier sections ensure that the journals are a fixed axial distance from one another and that axial distance cannot be changed.

Such a configuration of a planetary gearset has the advantage that thanks to the combined construction of the first carrier section with the planetary gearwheel axles as a casting, the planetary carrier of the planetary gearset can be produced more inexpensively, which results in a lower production cost of the planetary gearset as a whole. Owing to the integral formation of the journals constituting planetary gearwheel axles with the first carrier section and the attachment of the second carrier section to the journals, the journals are also held axially at both ends at the respectively chosen distance apart, so that the planetary carrier is very rigid. Accordingly, the planetary carrier can also be used without problems in a planetary gearset designed to transmit large torques.

An essential feature of the invention is that the first carrier section and the planetary gearwheel axles are made integrally as a casting with the planetary gearwheel axles projecting as journals axially relative to the first carrier section. When large torques are being transmitted by the planetary carrier, in order to prevent high stresses and larger displacements under load in the area of the journals, the journals are held fast between the first carrier section made integrally with them and the second carrier section made as a separate component. In that way the bending strength in the area of individual journals is increased, and this is achieved with little cost and effort.

In accordance with an embodiment of the invention, the first carrier section is of pot-shaped design, wherein the journals are made projecting axially from a radially extending bottom area of the first carrier section. Radially outside the journals the bottom area adjoins a hollow-cylinder-like section which extends axially in the same direction as the journals at least over the journals and which merges into an all-round flange section. Advantageously, in that way a form of the planetary carrier can be realized in which the journals and therefore the planetary gearwheels rotatably mounted on them, and the components of the planetary gearset which mesh with the gearwheels, are surrounded radially on the outside. Then, in the assembled condition of the planetary gearset the planetary carrier can be connected by means of its flange section so that the hollow-cylindrical section serves as a hollow shaft to transmit a torque. By virtue of the design of the first carrier section as a casting, this can be realized without problems.

According to a design possibility of the invention alternative to the above, the journals are formed so as to project axially from a web section of the first carrier section, such that the web section merges into a cylinder-like section on a side facing away from the journals. By way of this cylinder-like section the planetary carrier can be connected, in such manner that the cylinder-like section serves as a shaft-shaped section of the first carrier section which can transmit a torque. Preferably, the cylinder-like section forms a hub onto which a rotationally fixed connection to a shaft can be produced.

It is a further embodiment of the invention that the second carrier section is in the form of an annular disk, which connects the journals one after another in the circumferential direction on the second axial side. In that way a simpler structure of the second carrier section can be made, such that the second planetary carrier is arranged in a space-saving manner and can nevertheless hold the journals together with the first carrier section axially at both ends a fixed distance apart from one another. In this case the annular disk can be made as a shaped component, so enabling production costs to be kept low.

In a further development of the aforesaid embodiment, the annular disk, at least in the area of the attachment points at which the annular disk is attached to the journals, has in each case a radial extension by which the annular disk covers the individual journal radially with an inner ring of a respective bearing by means of which the planetary gearwheel is mounted rotatably on the journal concerned. Advantageously, besides increasing the bending rigidity of the journals the annular disk also fulfills the function of axially securing the individual inner ring on the journal concerned. In that way an additional securing ring which would otherwise have to be provided can be omitted, which further reduces the production cost. In particular each inner ring is in this case held axially between a contact shoulder of the first carrier section and the annular disk itself, whereby the first carrier section and the second carrier section in the form of the annular disk together provide axial securing means of the inner ring of the bearing by which each planetary gearwheel is mounted rotatably on its journal.

In the context of the invention, individual bearings are particularly preferably rolling bearings, in particular roller bearings such as needle bearings. However, as an alternative the individual bearings can be slide bearings.

In an alternative or supplementary further development, the annular disk is provided on an outer periphery with an all-round, axially extending web. In that way the rigidity of the annular disk forming the second carrier section can be increased in a simple manner.

Also, alternatively, or as a supplement, the attachment points at which the annular disk is fixed to the journals are connected to one another by offset segments. Thanks to the offsets of the segments an arrangement of the annular disk optimized as regards fitting space can be realized.

In accordance with a design possibility of the invention, the second carrier section is in each case screwed to the journals. In that way, advantageously, a reliable but detachable fixing of the second carrier section can be realized. Alternatively, however, the second carrier section could be fixed permanently and non-detachably to the journals, for example by means of welded joints.

In a further design form of the invention, the planetary gearwheels mesh both with a sun gear arranged radially inside the planetary gearwheels and also with a ring gear positioned radially around the planetary gearwheels. In that case the planetary gearset is a so-termed minus planetary gearset. Alternatively however, on the one hand a design of the planetary gearset according to the invention as a plus planetary gearset can also be considered, in which on the journals of the planetary carrier at least one planetary gearwheel pair is mounted rotatably, of which pair in each case one planetary gearwheel meshes with a radially inner sun gear and one planetary gearwheel with a radially surrounding ring gear, and the respective planetary gearwheels of the at least one pair also mesh with one another. On the other hand, however, the planetary gearset could also be in the form of a reduced planetary transmission, and in that case, it could be specifically designed as a Ravigneaux gearset. Then, besides a ring gear and the common planetary carrier two sun gears could be provided. Furthermore, besides the common planetary carrier and one sun gear a plurality of ring gears could also be provided.

In a combination of the above-mentioned embodiment with the variant of the invention in which the first carrier section is of pot-shaped design with a hollow cylinder-like section, the hollow cylinder-like section of the first carrier section projects axially beyond the sun gear and the ring gear and surrounds them radially on the outside.

An object of the invention is also a motor vehicle drivetrain which is provided particularly for use in a utility vehicle. This motor vehicle drivetrain comprises at least one planetary gearset according to one or more of the variants described above.

In accordance with an embodiment of a motor vehicle drivetrain according to the invention, this comprises at least one motor vehicle drive axle in which driveshafts are each coupled with an associated wheel hub. In this case, the coupling of the driveshaft concerned with the wheel hub in question can be accomplished in each case by means of a planetary gearset according to one or more of the variants described above. Thus, in this case the planetary gearset according to the invention functions as a compactly constructed wheel hub gear system or is part of a compactly constructed wheel hub gear system.

In a further development of the above embodiment, and when a planetary gearset is used in which one sun gear and one ring gear are provided, the sun gear of the respective planetary gearset is connected rotationally fixed to the driveshaft concerned while in contrast the respective planetary carrier of the planetary gearset concerned is connected rotationally fixed to a wheel hub in each case and the respective ring gear of each planetary gearset is fixed. In that way, a suitable structure for producing a motor vehicle drive axle can be realized. Particularly preferably, in each planetary gearset the first carrier section of the respective planetary carrier is of pot-shaped design, and the respective flange section of each first carrier section of each planetary carrier forms part of the respective wheel hub of the motor vehicle drive axle. This has the advantage that thereby a compactly constructed motor vehicle drive axle can be realized, in which in each case a planetary gearset functioning as a wheel-hub gear system is located axially at the level of, and radially inside the wheel hub and therefore the drive wheel to be attached thereto.

BRIEF DESCRIPTION OF THE DRAWINGS

Advantageous embodiments of the invention, which will be explained in what follows, are illustrated in the drawings, which show.

DETAILED DESCRIPTION

Figure 1:
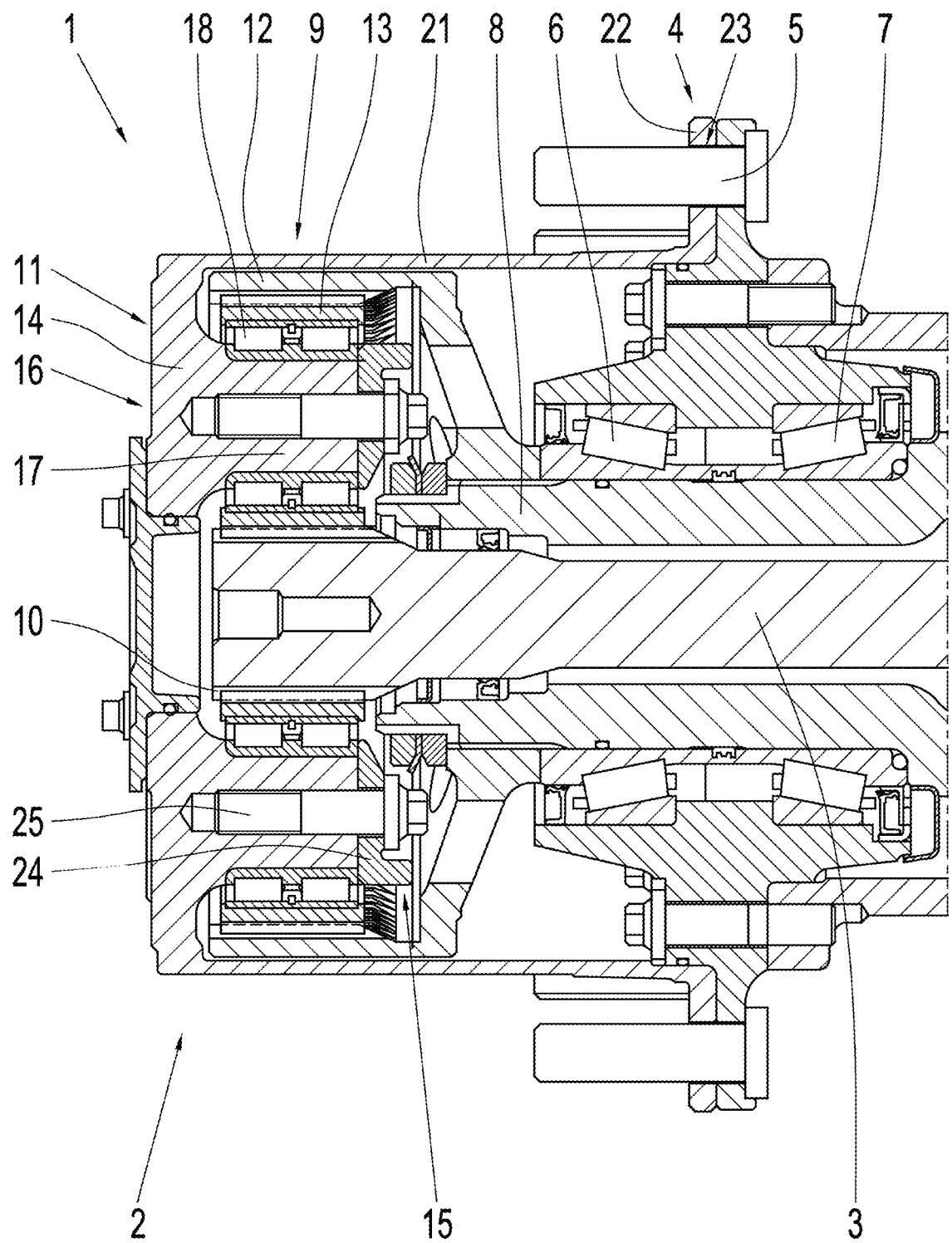
FIG. 1: A sectioned view of part of a motor vehicle drivetrain according to a possible design of the invention.

FIG. 1 shows a sectioned view of part of a motor vehicle drivetrain 1 according to the invention, wherein part of a motor vehicle drive axle 2 is shown, which is designed in accordance with an embodiment of the invention and is provided for use in a utility vehicle, in particular such as a truck. Specifically, in this case one of the drive output sides of the motor vehicle drive axle is represented, the other drive output side being the mirror-image of this one.

In the area of the motor vehicle drive axle 2 shown, a driveshaft 3 is coupled to a wheel hub 4 on which, on wheel bolts 5, a wheel with a tire can be fitted and which is mounted by means of bearings 6 and 7 to rotate relative to an axle housing 8 of the motor vehicle drive axle 2. The wheel hub 4 is coupled to the driveshaft 3 by way of a planetary gearset 9 designed in accordance with an embodiment of the invention.

The planetary gearset comprises a sun gear 10, a planetary carrier 11 and a ring gear 12, and by means of the planetary carrier 11 a plurality of planetary gearwheels 13 are guided and can rotate, these gearwheels each meshing individually with the sun gear 10 radially on the inside and also with the radially surrounding ring gear 12. Accordingly, the planetary gearset 9 is designed as a minus planetary gearset. The sun gear 10 is connected rotationally fixed to the driveshaft 3 since the driveshaft 3 is in the form of a pinion shaft which forms the sun gear 10 at one end of the shaft. In contrast, the ring gear 12 is connected rotationally fixed to the axle housing 8, whereas the planetary carrier 11 is connected rotationally fixed to the wheel hub 4.

Figure 2:
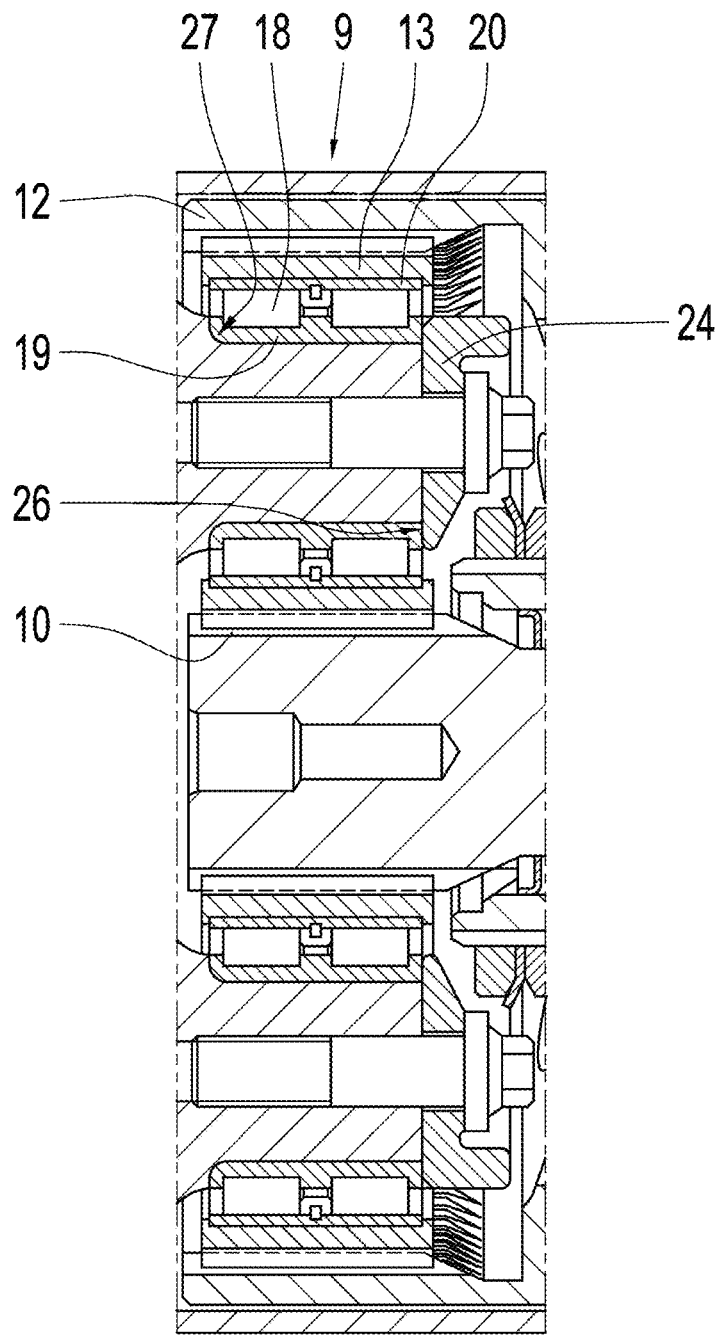
FIG. 2: A detail of the motor vehicle drivetrain in FIG. 1, in the area of a planetary gearset designed in accordance with an embodiment of the invention.
Figure 3:
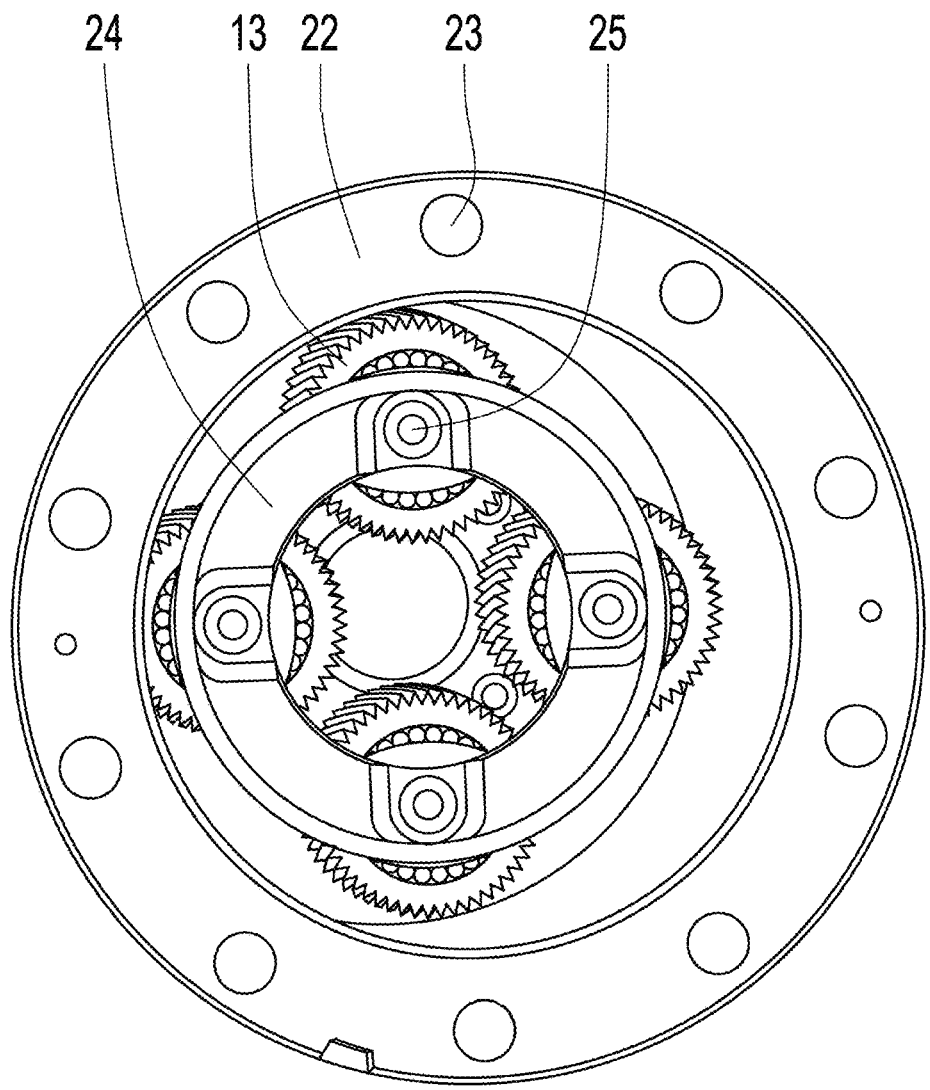
FIG. 3: A perspective view of the area of the planetary gearset shown in FIG. 2.

In this case the planetary carrier 11 is made with more than one component and consists of a first carrier section 14 and a second carrier section 15. The first carrier section 14 is made as a casting of pot-shaped form, and on a bottom section 16 of the first carrier section 14 there are axially projecting journals 17, on each of which a respective planetary gearwheel 13 is mounted to rotate by means of a bearing 18 in each case. The bearings 18 are each rolling bearings in the form of double-row roller bearings such that in the individual bearings 18—as can be seen in FIG. 2—a respective inner ring 19 is fitted onto the associated journal 17 whereas a respective outer ring 20 is held in the associated planetary gearwheel 13.

Radially outside the planetary gearwheels 13 and also the ring gear 12, the bottom section 16 then adjoins a hollow-cylinder-like section 21 which extends axially starting from the bottom section 16 in the direction of the journals 17 as far as the area of the wheel hub 4. In that way the rest of the components of the planetary gearset 9 are enclosed by the first carrier section 14 of the planetary carrier 11. Axially at the level of the bearings 6 and 7 the section 21 ends in an all-round flange section 22 which extends radially outward relative to the section 21 and forms part of the wheel hub 4, in that the flange section 22 is provided with a plurality of holes 23 through which the wheel bolts 5 pass.

In order to be able reliably to support the forces on the planetary carrier 11 when a drive movement is transmitted from the driveshaft 3 to the wheel hub 4 by way of the planetary gearset 9, and also to keep the planetary gearwheels 13 on their journals 17 a fixed distance apart, the second carrier section 15 is attached axially to the journals 17 on a side facing away from the bottom section 16. In that way the journals 17 are held axially at both ends and their rigidity is increased. As can be seen in particular in an overall view together with the further FIGS. 3 to 6, the second carrier section 15 is in the form of an annular disk 24 by means of which the journals 17 are connected to one another in sequence in the circumferential direction. In this case the annular disk 24 is fixed to the individual journals 17 by fixing screws 25 in each case.

Figure 4:
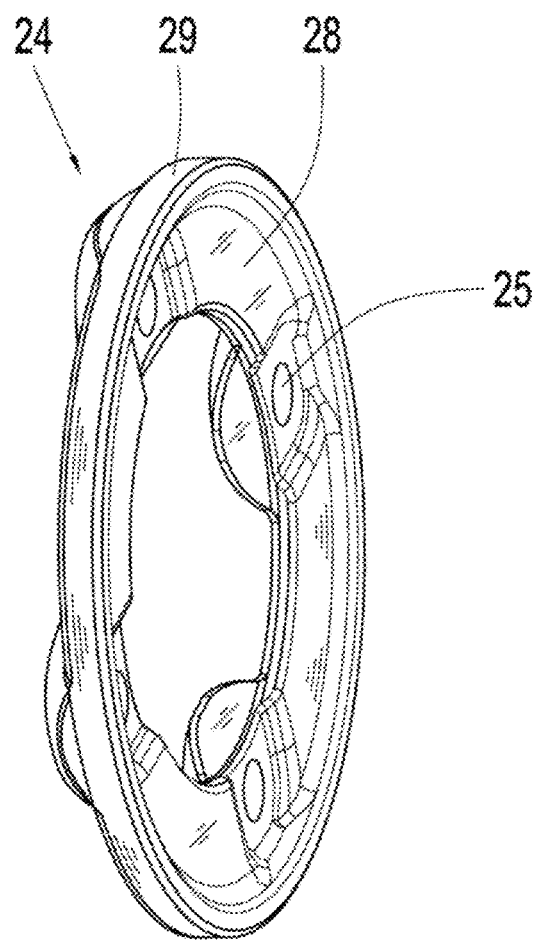
FIGS. 4 to 6: Various individual views of an annular disk of the planetary gearset shown in FIGS. 2 and 3.
Figure 5:
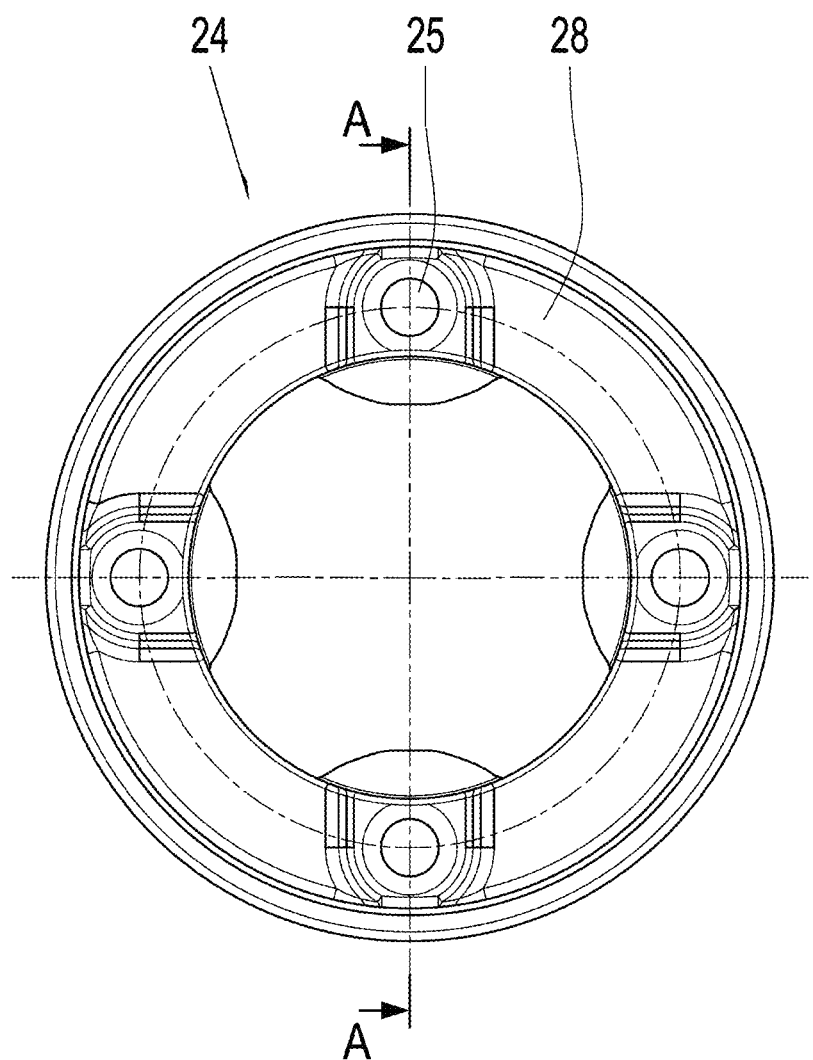
Figure 6:
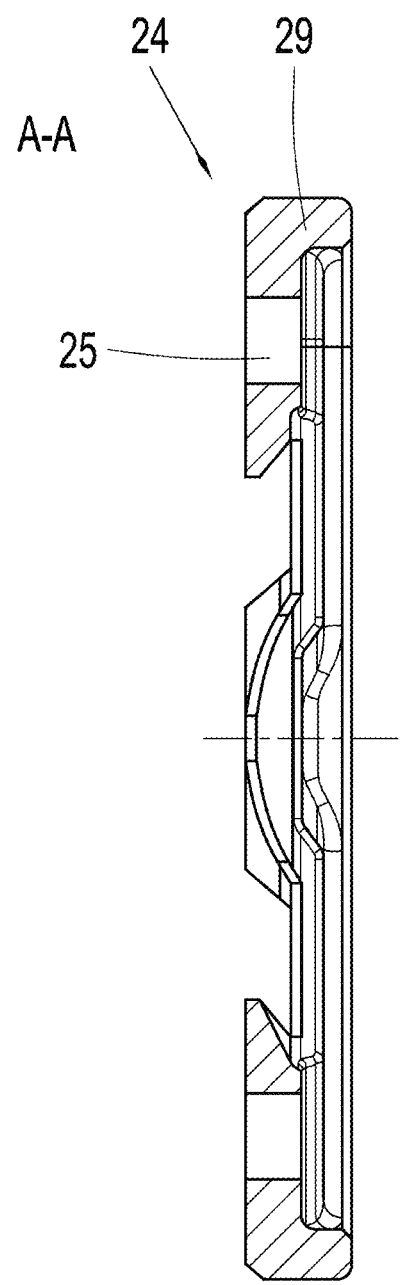

As can be seen in the individual representations of the annular disk 24 in FIGS. 4 to 6, the annular disk 24 is made in one piece, here specifically in the form of a shaped component. In the area of the attachment points 25 where the annular disk 24 is screwed to the journals 17, the annular disk 24 has in each case a radial extension with which the annular disk 24 on the individual journals 17 radially overlaps the inner ring 19 of the associated bearing 18. By virtue of this radial widening of the annular disk 24 in the area of the attachment points 25, in the area of the individual journals 17 in each case a contact surface 26 is defined by means of which the inner ring 19 concerned is held axially between the annular disk 24 and a respective contact shoulder 27 of the individual journal 17. Thus, besides increasing the rigidity of the planetary carrier 11 the annular disk 24 also serves to secure the inner ring 19 of the bearing 18 axially. The widening of the annular disk 14 in the area of the attachment points 25 is produced radially on the inside by means of bevels.

The attachment points 25 are connected to one another in the circumferential direction by means of offset segments 28, which project relative to the attachment points 25 axially in a direction extending away from the journals 17. Furthermore, on an outer periphery the annular disk 24 is provided with an all-round section 29 which, starting from the rest of the annular disk 24, extends in the axial direction. Thanks to this section 29 the rigidity of the annular disk 24 is increased.

Figure 7:
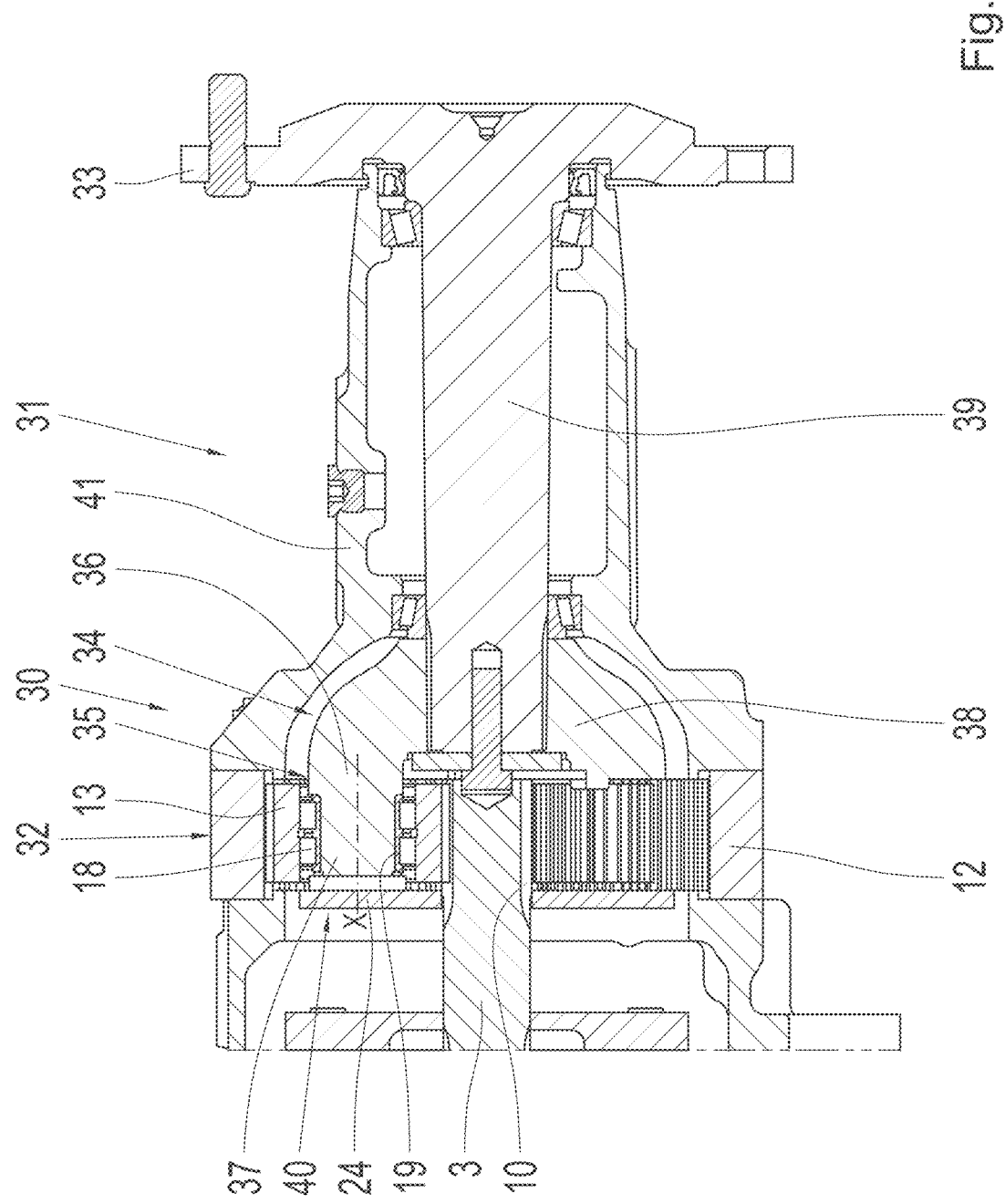
FIG. 7: A sectioned view of part of a motor vehicle drivetrain corresponding to a further embodiment of the invention.

Furthermore, FIG. 7 shows a sectioned view of part of a motor vehicle drivetrain 30, of which part of a motor vehicle drive axle 31 is represented. This motor vehicle drive axle 31 is provided for use in a working vehicle, preferably an agricultural tractor. The motor vehicle drivetrain 30 in this case corresponds largely to the previous variant shown in FIGS. 1 to 6, in that here too a driveshaft 3 is coupled by way of a planetary gearset 32 to a wheel hub 33. Other than in the previous variant, in this case in the planetary gearset 32 a first carrier section 34 of a planetary carrier 35 is provided, such that the carrier section 34 is in the form of a casting and on a web section 36 thereof a plurality of axially projecting journals 37 are formed integrally, on which the planetary gearwheels 13 of the planetary gearset 32 are each mounted to rotate. On a side facing axially away from the journals 37 the web section 36 merges into a cylindrical section 38 with which the carrier section 34 is attached rotationally fixed onto a driveshaft 39. The driveshaft 39 is made integrally with the wheel hub 33.

In this planetary carrier 35 too an annular disk 24 is provided, which, however, is shown only schematically in FIG. 7, and which forms a second carrier section 40 of the planetary carrier 35. Here the annular disk 24 is designed essentially analogously to the one in the variant shown in FIGS. 1 to 6 and is fixed onto the respective journals 37. Also, analogously to the previous variant, the planetary gearwheels 13 each mesh on the one hand with the radially inner sun gear 10, which is made integrally with the driveshaft 3, and on the other hand with the radially surrounding ring gear 12. The latter is formed by an axle housing 41 of the motor vehicle drive axle 31. The interaction of the annular disk 24 with the first carrier section 34 again increases the rigidity of the planetary carrier 35 during the transmission of a drive movement from the driveshaft 3 to the drive output shaft 39, while in addition the annular disk 24 together with the web section 36 axially secures inner rings 19 of the bearings 18 of the planetary gearwheels 13.

By virtue of the design according to the invention, in each case a planetary gearset can be provided which is characterized by low production cost and also by means of which large torques can be transmitted without problems.

INDEXES

1 Motor vehicle drivetrain
2 Motor vehicle drive axle
3 Driveshaft
4 Wheel hub
5 Wheel bolts
6 Bearing
7 Bearing
8 Axle housing
9 Planetary gearset
10 Sun gear
11 Planetary carrier
12 Ring gear
13 Planetary gearwheels
14 First carrier section
15 Second carrier section
16 Bottom section
17 Journals
18 Bearings
19 Inner ring
20 Outer ring
21 Section
22 Flange section
23 Holes
24 Annular disk
25 Attachment points
26 Contact surface
27 Contact shoulder
28 Segment
29 Section
30 Motor vehicle drivetrain
31 Motor vehicle drive axle
32 Planetary gearset
33 Wheel hub
34 First carrier section
35 Planetary carrier
36 Web section
37 Journals
38 Section
39 Driveshaft
40 Second carrier section
41 Axle housing

The invention claimed is:

1. A planetary gearset comprising:
a planetary carrier with a plurality of planetary gearwheel axles arranged axially offset relative to one another;
a planetary gearwheels rotatably mounted on each of the plurality of planetary gearwheel axles;
a first carrier section is arranged on a first axial side of the planetary gearwheel, the first carrier section is in a form of a casting, wherein each of the planetary gearwheel axles is made integrally with the first carrier section in a form of axially projecting journals, wherein the first carrier section has a cup shape with a radially extending bottom section connected as one piece with a first end of a hollow cylindrical wall that extends axially therefrom, and wherein the journals project axially from the radially extending bottom section of the first carrier section in a same direction as the hollow cylindrical wall and are located radially inside of the hollow cylindrical wall;
a second carrier section is attached as a separate component to smooth end faces of the journals; and
the first carrier section and the second carrier section hold the journals at both ends at fixed, unvarying axial distances from one another.

2. The planetary gearset according to claim 1, wherein the first carrier section and the hollow cylindrical wall extend axially beyond the journals to a second end that merges into an all-round flange section that extends radially outward.

3. The planetary gearset according to claim 1, wherein the journals project axially from a web section of the first carrier section, and the web section merges axially on a side of the bottom section facing away from the journals into the hollow cylindrical wall.

4. The planetary gearset according to claim 1, wherein the second carrier section is in a form of an annular disk which connects the journals on the second axial side, in sequence with one another in the circumferential direction.

5. The planetary gearset according to claim 4, wherein at least in an area of attachment point, where the annular disk is attached to the journals, the annular disk has, in each case, a radial extension by which the annular disk, at each journal, covers an inner ring of a respective bearing by means of which the associated planetary gearwheel is mounted rotatably on the journal concerned.

6. The planetary gearset according to claim 5, wherein each inner ring is held axially between a respective contact shoulder of the first carrier section and the annular disk.

7. The planetary gearset according to claim 4, comprising an all-round, thickened axially extending section at an outer circumference of the annular disk which increases rigidity of the annular disk.

8. The planetary gearset according to claim 4, comprising offset segments connecting attachment points at which the annular disk is attached to the journals, the offset segments connect the attachment points to one another in a circumferential direction, and the offset segments project, relative to the attachment points, axially in a direction extending away from the journals.

9. The planetary gearset according to claim 1, wherein the second carrier section is in each case screwed to the end faces of the journals by fixing screws.

10. The planetary gearset according to claim 1, wherein each planetary gearwheel meshes both with a sun gear arranged radially inside relative to the planetary gearwheels and also with a ring gear positioned radially around the planetary gearwheels.

11. The planetary gearset according to claim 10, wherein:
the first carrier section has a cup shape with a radially extending bottom section formed as a single piece with a hollow cylindrical wall connected at a first end to the bottom section and extending axially away from the bottom section,
the journals project axially from the radially extending bottom section of the first carrier section;
the hollow cylindrical wall extends to a second end axially beyond the journals and in the same direction as the journals, and the hollow cylindrical wall merges at the second end into an all-round flange section, and
the hollow cylindrical wall of the first carrier section extends axially over the sun gear and the ring gear and surrounds them radially on an outside.

12. A motor vehicle drivetrain comprising at least one planetary gearset according to claim 1.

13. The motor vehicle drivetrain according to claim 12 and comprising at least one motor vehicle drive axle having driveshafts each coupled to an associated wheel hub, by way of the planetary gearset.

14. The motor vehicle drivetrain according to claim 13, wherein each planetary gearwheel meshes both with a sun gear arranged radially inside relative to the planetary gearwheels and also with a ring gear positioned radially around the planetary gearwheels, a respective sun gear of the planetary gearset concerned is connected rotationally fixed to a respective driveshaft, while a respective planetary carrier of the planetary gearset concerned is connected rotationally fixed to a respective wheel hub, and the ring gear of the planetary gearset concerned is fixed.

15. The motor vehicle drivetrain according to claim 14, wherein:
the hollow-cylinder-like section is radially outside of the journals and extends in the same direction as the journals to a second end that is axially beyond the journals and which merges into an all-round flange section; and
the respective flange section of the first carrier section of the associated planetary carrier forms at least part of the respective wheel hub of the motor vehicle drive axle.

\* \* \* \* \*